United States Patent [19]
Heinonen

[11] 3,880,091
[45] Apr. 29, 1975

[54] CAR SNACK TABLE

[76] Inventor: George W. Heinonen, 3414 Zane Ave. North, Minneapolis, Minn. 55422

[22] Filed: Feb. 14, 1972

[21] Appl. No.: 226,097

[52] U.S. Cl. .................................................. 108/44
[51] Int. Cl. ...................... A47b 23/00; A47b 37/00
[58] Field of Search ................ 108/42, 49, 128–134, 108/106, 144; 5/327, 332, 70; 248/295, 298, 287, 188.5; 297/338–345, 440, 164

[56] References Cited
UNITED STATES PATENTS

| | | | |
|---|---|---|---|
| 590,872 | 9/1897 | Allen | 248/157 X |
| 1,533,857 | 4/1925 | Hart | 108/129 X |
| 1,600,823 | 9/1929 | Hess | 108/129 |
| 2,626,845 | 1/1953 | Dubach | 108/132 X |
| 2,951,733 | 9/1960 | Fields | 248/157 |
| 2,986,438 | 5/1961 | Smathers et al. | 108/116 |
| 3,094,080 | 6/1963 | Shannon | 108/129 |
| 3,491,705 | 1/1970 | Blanke | 5/332 |
| 3,593,949 | 7/1971 | Fliege | 248/157 |

FOREIGN PATENTS OR APPLICATIONS

| | | | |
|---|---|---|---|
| 216,704 | 1961 | Austria | 297/423 |
| 462,142 | 3/1937 | United Kingdom | 5/332 |

*Primary Examiner*—Paul R. Gilliam
*Assistant Examiner*—D. H. Corbin
*Attorney, Agent, or Firm*—Stuart R. Peterson

[57] ABSTRACT

The table includes a panel having first and second foldable or hingedly connected legs. The first legs have a fixed length and a lateral spacing sufficient to straddle the usual driveshaft hump of a motor vehicle, whereas the second legs have an adjustable length and a lesser lateral spacing so that they rest on the forward portion of the hump. The adjustment, which permits leveling the panel for use with virtually any automobile or truck, is achieved by extending portions of the second legs and then clamping them to provide the proper level.

3 Claims, 5 Drawing Figures

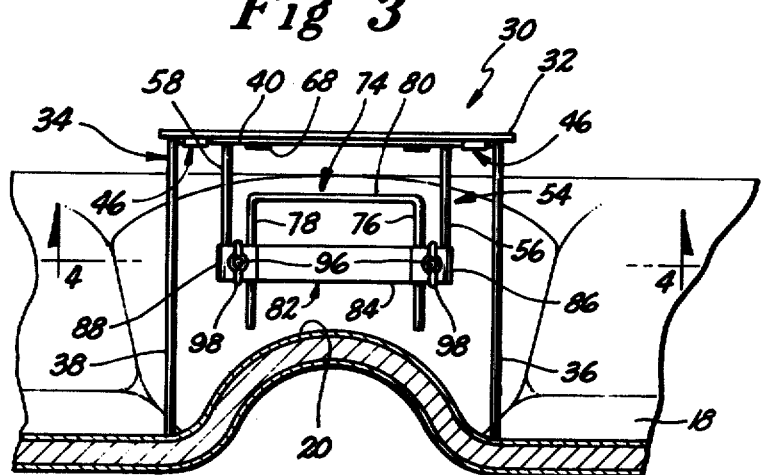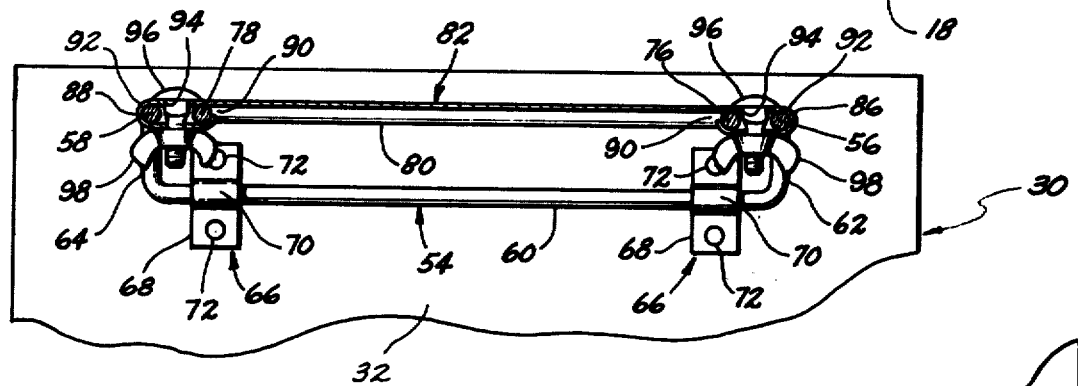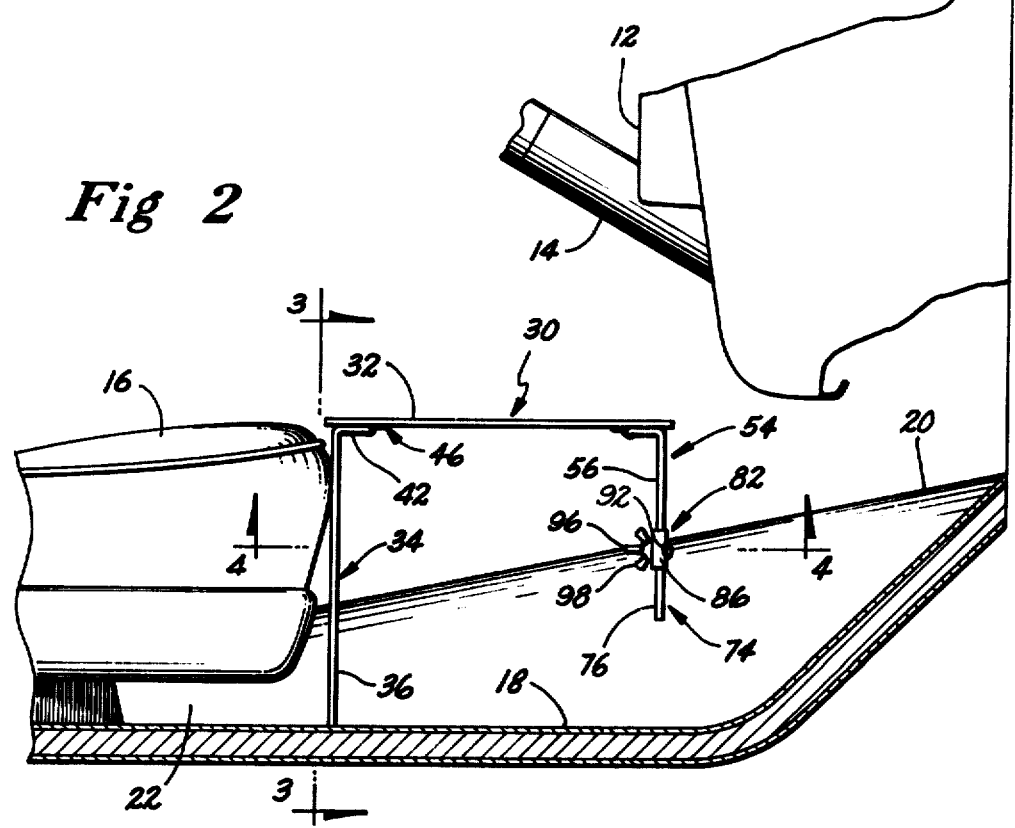

CAR SNACK TABLE

OBJECTS OF THE INVENTION

One object of the invention is to provide a lightweight table that can be conveniently placed over the driveshaft hump of a motor vehicle so that it will be readily accessible to both the driver and the front seat passenger. It is contemplated that a table constructed in accordance with the teachings of my invention will find especial utility by travelers and drive-in customers for use as a table for various types of snacks.

Another object is to provide a table of the foregoing character possessing considerable versatility in that it can be used in virtually any automobile and truck. In this regard, it is planned that one pair of legs be spaced sufficiently so as to span the portion of the usual transmission hump just forward of the front seat, and that a second pair of legs, which are vertically adjustable, be spaced a lesser distance apart so as to rest on a more forward part of the hump. It is, therefore, an aim of the invention to level the table for any given hump.

Another object, which is closely allied with the preceding object, is to provide a snack table for cars that will necessitate only one leveling adjustment, the table assuming a level condition each time it is again placed over the hump of the same vehicle.

A further object of the invention is to provide a portable table that can be collapsed or its legs folded without affecting the level adjustment previously realized.

Yet another object is to provide a simple clamping mechanism that provides a rigid front leg support once the adjustment has been made, although the clamps may be easily released to enable a different adjustment, such as when my table is to be used in another vehicle.

An important object is to provide a table that can be folded or collapsed to an extent that it can be stored beneath the vehicle's front seat. The envisaged construction results in a compact table having a vertical dimension on the order of only 1 ½ inches when collapsed, thereby allowing the purchaser to slide it under the seat when not in use.

Still another object is to provide a table possessing considerable stability without requiring any fastening thereof to any part of the vehicle. This feature not only enhances the versatility of the table, but allows it to be quickly collapsed and stored when not needed.

Also, it is an object to provide a table of the above-mentioned type that will not only be inexpensive to manufacture but aesthetically pleasing, these factors additionally encouraging its widespread use.

SUMMARY OF THE INVENTION

Briefly, the invention comprises a panel, such as plastic, to which are hingedly connected one pair of legs having a fixed length and a lateral spacing sufficient to engage the floor of either side of the hump and a second pair of legs having less spacing, these legs being adjustable in length to permit the user to level the table. The legs are all formed from appropriately bent steel rods. Two generally U-shaped rods constitute the adjustable legs, easily manipulated clamps maintaining the proper length until the length is to be changed. By means of offset portions or sections formed in the rods constituting the legs, limits or stops are formed so that the legs can be pivoted into a generally perpendicular supporting relation with the panel. The lateral spacing of the legs is such that one pair rests within the other when the table is to be stored.

BRIEF DESCRIPTION OF THE DRAWINGS

FIG. 2 is a side elevational view of the table in use;

FIG. 3 is a rear elevational view of the table, the view being taken in the direction of line 3—3 of FIG. 2;

FIG. 4 is an enlarged sectional view of the forward portion of the table, the view being taken in the direction of lines 4—4 of FIGS. 2 and 3.

DESCRIPTION OF THE PREFERRED EMBODIMENT

Figure 1:
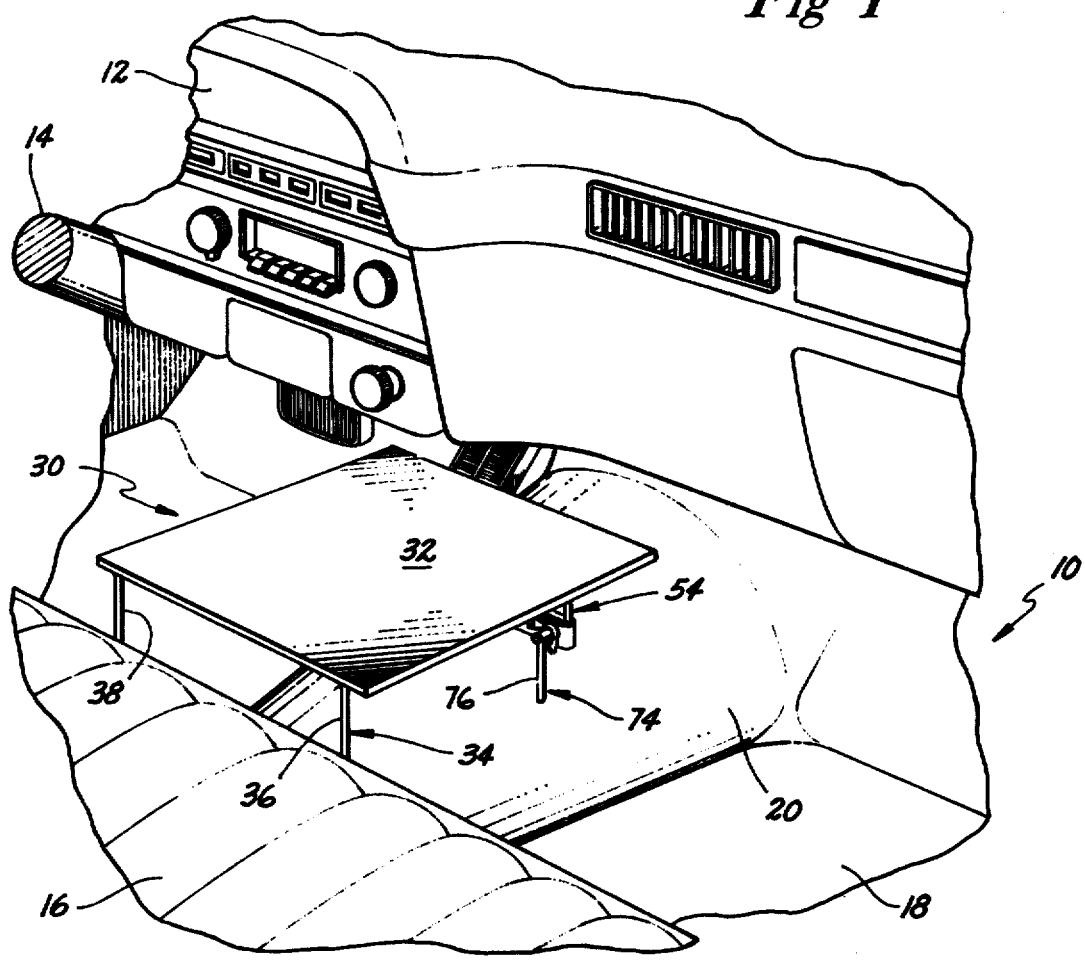
FIG. 1 is a fragmentary perspective view of a typical automobile illustrating my snack table in actual use over the driveshaft hump thereof.

In order to appreciate the benefits to be derived from my invention, a fragmentary portion of an automobile 10 has been pictured in FIG. 1. The vehicle 10 includes a dashboard 12, steering wheel column 14 and front seat 16. More importantly, though, as far as backgrounding the present invention is concerned, is the floorboard 18 and the driveshaft hump 20 extending upwardly therefrom. Also, although conventional, it will be perceived that a space 22 exists between the seat 16 and the floorboard 18.

The table exemplifying my invention has been denoted generally by the reference numeral 30. For simplicity, it will be assumed that a flat panel or board 32 provides the supporting surface for the snacks and other items to be placed on the table in use. It will further be assumed that the panel 32 constitutes a layer or sheet of suitable rigid plastic material.

A first generally U-shaped rod 34, preferably of ¼ inch steel, comprises a pair of straight parallel portions 36, 38 constituting a pair of legs having a fixed length, an interconnecting transverse portion 40, and offset portions 42, 44 (best viewed in FIG. 4), these offset portions functioning as limits or stops that provide a perpendicular relation of the leg portions 36, 38 with respect to the plane of the panel 32 when the table 10 is being used. Recapitulating for the moment, from FIG. 3 it will be discerned that the rod 34 possesses a generally U-shaped appearance, and from FIG. 5 it will be observed that the offset or limit portions 42 and 44, together with the transverse or bridging portion 40, form what might be termed a secondary "U" and which is referred to as a U-shaped rod member in certain of the claims.

The U-shaped rod 34 is hinged or pivoted to the underside of the panel or board 32 by a pair of clips 46 each having mounting wings or ears 48 and a central U-shaped portion 50 which partially encircles a section of the transverse portion 40. Actually, the laterally spaced sections of the transverse rod portion 40 which are encircled by the two clips 46 are close to the offset portions 42 and 44; in this way the U-shaped rod 34 is prevented from undue lateral shifting. The clips 46 in each instance are attached to the panel 32 by rivets 52, there being one rivet extending through each wing 48 as can be seen from FIG. 5. Largely for appearance reasons, but also to assure a smooth top surface, the rivets 52 do not go completely through the panel 32. Accordingly, it will be understood that the panel 32 may be composed of plural laminations, the uppermost layer covering and concealing the upper rivet heads.

Figure 5:
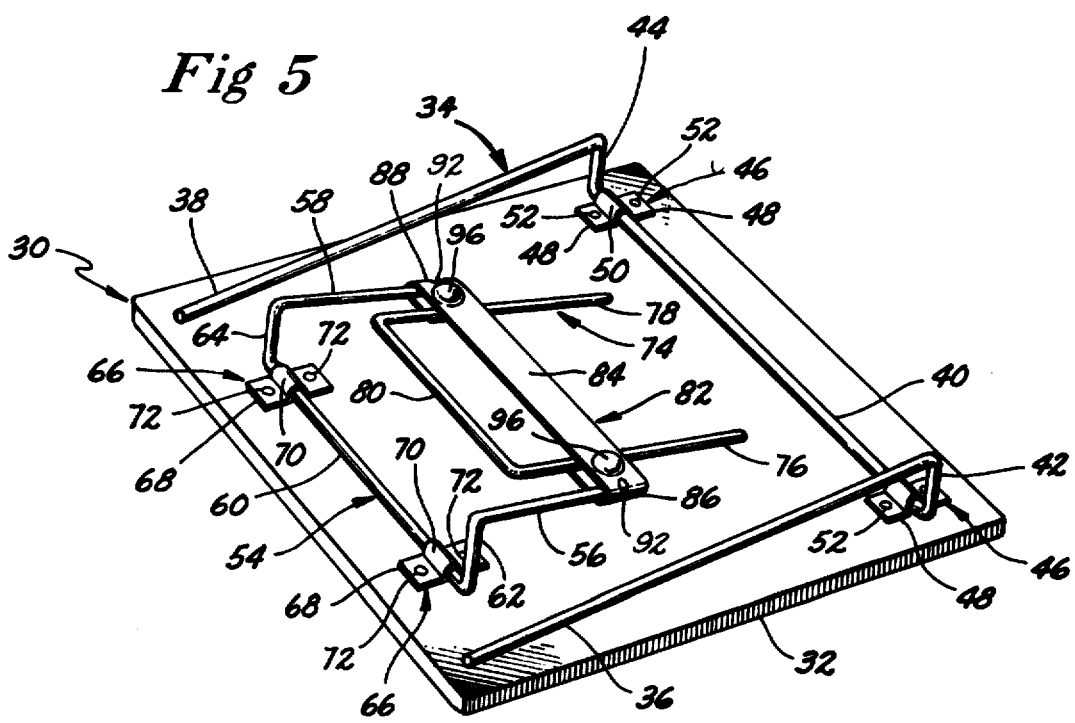
FIG. 5 is an inverted perspective view of my table with the legs folded so as to enable the table to be placed under the front seat of a car.

A second generally U-shaped rod 54, also preferably of ¼ inch steel stock, includes parallel straight portions 56, 58, a transverse interconnecting portion 60 plus the offset limit or stop portions 62, 64. As can be seen in FIGS. 4 and 5, the portions 60, 62, 64 form a secondary "U", thus corresponding to the earlier-mentioned secondary "U" comprised of the portions 40, 42 and 44 and also referred to as a U-shaped rod member in certain claims.

Clips 66, identical to the clips 46, have wings 68 and an intermediate U-shaped portion 70. Rivets 72 anchor the clips 66 to the panel 32 so that the U-shaped rod 54 can be pivoted in the same manner as the rod 34. Here again, the clips 66 should be located near the offset portions 62 and 64 to minimize the likelihood of the U-shaped rod 54 shifting sideways.

Still a third U-shaped rod 74 is incorporated into the table 30 illustrating my invention. Once again, I have found ¼ inch stock entirely satisfactory. In this instance, however, the U-shaped rod includes parallel straight portions 76, 78 and a transverse interconnecting portion 80, there being no offset portions corresponding to the previously referred to offset portions 42, 44 or 62, 64.

At this time attention is directed to a metal strip 82 having a bridging portion 84 and reversely turned or bent ends 86, 88 forming gaps at 90. The reversely turned ends 86, 88 are fixedly, or at least immovably, carried on the elongated portions 56, 58, these portions 56, 58 each having a small notch (too small to illustrate) formed therein and into which is crimped at 92 a dimple section of the associated reversely turned end 86 or 88, as the case may be. However, the elongated portions 76, 78 are slidably received in the reversely turned ends 86, 88.

Aligned square holes 94 are formed in the reversely turned ends 86, 88 and the four flats integrally adjacent the rounded heads of two carriage bolts or screws 96 are accommodated in the square holes 94. A wing nut 98 is threaded onto each bolt 96. In this way, when the nuts 98 are tightened, the reversely turned ends 86, 88 are forced tightly against the elongated or straight portions 76, 78. In other words, the ends 86 and 88, together the the two bolts or screws 96, constitute releasable clamps.

From the foregoing, it will be appreciated that the elongated straight portions 56, 76 function as one of a pair of adjustable legs and the portions 58, 78 as the other.

In use, the first U-shaped rod 34 is swung into the position depicted at the left in FIG. 2, the offset portions 42, 44 limiting further swinging when they abut the panel 32. The elongated portions 36, 38 constitute legs having a fixed length and their length will be selected so as to position the panel 32 at approximately the height of the average seat 16. Of course, front seats differ in height very slightly from vehicle model to vehicle model, and even from manufacturer to manufacturer. Even so, it is in no way critical that the table height match the seat height.

However, it is important that the table 30 be level. Unfortunately, driveshaft humps 20 do vary considerably in dimensions. Nonetheless, the extendability and retractability of the elongated portions 76, 78 with respect to the portions 56, 58, after the U-shaped rod 54 has been pivoted downwardly, enable the user to achieve whatever degree of leveling is needed. All that is required is that the wing nuts 98 be loosened and then retightened when the front legs 56, 76 and 58, 78 are the proper length.

As can be learned from FIGS. 3 and 5, the legs or portions 36, 38 have the greater lateral spacing, sufficient to straddle the usual hump 20. Next, as far as spacing is concerned, are the elongated portions 56, 58, whereas the portions 76, 78 have the least lateral spacing. When the first pair of legs 36, 38 are folded toward the panel 32 in collapsing the table 30 and then the second pair folded, which are composed of the portions 56, 76 (one adjustable leg) and 58, 78 (the other adjustable leg), the nested leg configuration appearing in FIG. 5 results.

After collapsing the table 30 into the compact condition illustrated in FIG. 5, it can be readily inserted into the space 22 beneath the front seat 16 of most motor vehicles. This has proved to be of considerable practical advantage as far as easy and convenient storage are concerned. Also, the described construction allows the table to be repeatedly used in the same vehicle without further leg adjustment.

I claim:

1. A snack table for use over the driveshaft hump in the floor of a vehicle comprising a rigid panel member, a first generally U-shaped rod member having a transverse portion and a pair of straight elongated portions, said elongated portions being integrally connected at only one end thereof to the opposite ends of said transverse portion and extending generally perpendicularly therefrom with a spacing therebetween so as to provide laterally spaced free ends remote from said connected one ends for engaging the vehicle floor to either side of the driveshaft hump, said transverse portion being hinged to said panel member near the edge thereof to be located toward the seat of the vehicle, a second generally U-shaped rod member having a transverse portion and a pair of straight elongated portions, said elongated portions of said second U-shaped member being integrally connected at one end thereof to the opposite ends of said transverse portion of said second U-shaped member and extending generally perpendicularly therefrom, the transverse portion of said second U-shaped member being hinged to said panel member near the edge thereof to be located away from the vehicle seat, said elongated portions of said second generally U-shaped rod member having a lesser spacing than the elongated portions of said first U-shaped member, a third generally U-shaped rod member having a transverse portion and a pair of straight elongated portions, the elongated portions of said third U-shaped member being integrally connected at one end thereof to the transverse portion of said third U-shaped member and the elongated portions of said third U-shaped member having a lesser spacing therebetween than the elongated portions of said second U-shaped member, and means adjustably clamping the elongated portions of said third U-shaped rod member to the elongated portions of said second U-shaped rod member in the same plane with each other to level said panel member.

2. A snack table as defined in claim 1 in which said first and second U-shaped rod members are formed with offset portions limiting the pivotal movement of these said two U-shaped portions into a generally perpendicular relationship with said panel member.

3. A snack table for use over the driveshaft hump in the floor of a vehicle comprising a generally flat panel member providing a surface on which articles may be placed and supported, a first pair of legs pivotally connected only at one end to spaced locations on said panel member to provide spaced opposite ends for engaging the vehicle floor, a pair of first elongated members pivotally connected only at one end to spaced locations on said panel member which are spaced from said first-mentioned locations, a pair of second elongated members, holding means adjacent the opposite ends of said first elongated members slidably mounting said second elongated members in relation to said first elongated members to permit adjustment of the length of said second elongated members with respect to said first elongated members, said holding means including a strip reversely turned at its ends, said reversely turned strip ends being fastened to said first members of said second legs at said opposite ends thereof and projecting back into a confronting relation with the second members of said second legs, said holding means further including a screw extending through each reversely turned end intermediate the first and second members and a nut threadedly carried on each screw for clamping said reversely turned ends against the second members of said second legs, and a transverse member interconnecting said second members only at one end thereof to form a U-shaped unit so that said second members are adjusted in unison, whereby said first and second elongated members form a second pair of legs and said second elongated members provide spaced opposite ends for engaging the vehicle floor at a different elevation from that of said opposite ends of the first legs.

* * * * *